Patented July 25, 1933

1,919,216

UNITED STATES PATENT OFFICE

STANLEY L. HANDFORTH AND WILLIAM E. KIRST, OF WOODBURY, NEW JERSEY, ASSIGNORS TO E. I. DU PONT DE NEMOURS & COMPANY, OF WILMINGTON, DELAWARE, A CORPORATION OF DELAWARE

PROCESS OF AMMONIA OXIDATION

No Drawing. Application filed August 21, 1929. Serial No. 387,559.

This invention relates to a process for oxidizing ammonia to form oxides of nitrogen, and more particularly to an improved form of catalyst by which such a process may be carried out.

According to prior art practice, ammonia and an oxygen containing gas are passed through a catalyst in the form of gauze composed of platinum or essentially of platinum. Usually such a catalyst is in the form of two to four layers of a fine mesh gauze comprising from 60 to 150 mesh per linear inch, and constructed of wire from .0015 inch to .0035 inch in diameter. The most common form of catalyst of this type comprises an 80 mesh gauze made of .003 inch wire, usually in four layers.

It has been possible with catalysts of this kind when the process of oxidizing ammonia has been operated at atmospheric pressure to cause the reaction of 100 pounds of ammonia per ounce of catalyst per day. In such processes and with commercially possible ammonia-air or oxygen mixtures the gas remains in the catalyst zone about .00016 second, while the linear velocity of the hot gas through the catalyst has been approximately 12 feet per second.

Flat gauzes of the type of the foregoing have been used in ammonia oxidization both in this country and in Europe but in order to economically operate such a process on a large capacity scale, it has been necessary to employ very large apparatus. For example, plants are in operation with two-meter diameter flat catalysts. To overcome this objectionable feature, Jonés and Parsons (U. S. Patent 1,321,376) proposed a modified form of platinum gauze for this purpose comprising a cylindrical or so-called basket type of catalyst. In the oxidization process platinum is lost from the catalyst by volatilization. All catalysts so far used are so weakened when a portion of the platinum is lost in this way as to necessitate scrapping them. This requires refabricating the catalyst into new gauzes and entails quite an expense in itself, since from 80 to 85 percent of the metal must be reworked.

Where ammonia oxidation processes have been carried out under pressures greater than atmospheric with the platinum catalysts so far proposed, the conversion efficiencies of ammonia to oxides of nitrogen have not been as high as with atmospheric pressure operation. Conversion efficiencies of approximately 99% have been obtained where the process has been operated at atmospheric pressure. Under 100 pounds pressure, however, the conversion efficiencies have been from 5 to 10 percent lower. When the process is operated under 100 pounds pressure and at the same rate as previously described for atmospheric pressure, the gas remains in contact with the catalyst approximately .0012 seconds and its linear velocity through the catalyst is only 1.6 feet per second. This means an eight times longer contact duration in the catalyst at one-eighth as great a velocity through it.

G. Fauser, Chim. et Ind. vol. 20, page 414 (1928), describes the use of a fine mesh catalyst of two layers with which he obtained a rate 2.4 times as great as that of the prior art described in the foregoing. The conversion efficiency, however, was only 91.2 percent. The time of contact on the catalyst was .00022 second and the linear velocity through it at 50 pounds pressure was about 2.3 feet per second.

Our present invention has as an object an improved process for oxidizing ammonia in which greater efficiencies of conversion are obtained than have been possible according to the prior art practice, particularly under pressures greater than atmospheric. Another object of our invention is a process by which the costly reworking of the catalyst used in ammonia oxidation is obviated. A still further object of our invention is a process capable of converting larger amounts of ammonia per ounce of catalyst per day than has heretofore been possible. Other objects will appear as the description proceeds.

We have found that the difficulties of the prior art may be overcome and the foregoing objects may be accomplished by a process in which the thickness of the bed of catalytic material is substantially increased.

The following tabulation of prior art catalysts and of the present invention will indicate some of the distinctions and advantages of the present invention:

| | Rate #NH$_3$/oz. of cat./day | Gauze weave | | No. of layers | Contact time sec. | Vel. ft./sec. |
|---|---|---|---|---|---|---|
| | | Mesh | Wire | | | |
| Ostwald (various-experimental) Kaiser-Ger. | | 80 | .0024 | 4 | 0.0006 | 2.7 |
| United Alkato Co. G. B. | 50 to 100 | 80 | .0026 | 4 | .00018 to .00036 | 5 to 10 |
| Landis, U.S.A. | 60 | 60 | .005 | 2-4 | .00019 | 9 to 18 |
| Parsons Jones | 97 | 80 | .0026 | 4 | .00018 | 9.5 |
| Bamag, Ger. | 50 to 150 | 150 | .0016 | 2 | .00013 to .0004 | 1.3 to 4 |
| Fauser, Fr., Atmos. | 50 | 150 | .0015 | 2 | .00018 | 2.8* |
| Fauser, pressure (50#) | 250 | 150 | .0015 | 2 | .00022 | 2.3* |
| DuPont, atmos. | 100 | 80 | .003 | 4 | .00016 | 12-18 |
| DuPont, pressure (100#) | 100 | 80 | .003 | 4 | .0012 | 1.6 |
| Present inv. atmos. | 100 | 80 | .003 | 16 | .00016 | 48 |
| Present inv. atmos. | 100 | 150 | .0015 | 16 | .00019 | 21 |
| Present 100# pressure | 800 | 80 | .003 | 16 | .00015 | 49 |
| Present 100# pressure | 800 | 150 | .0015 | 16 | .00018 | 21 |

*Calculated by a different method.

We have found that a substantial part of the loss in efficiency of prior known processes is due to decomposition to free nitrogen of the oxides of nitrogen first formed. It is known that this reaction is catalyzed by the same material that catalyzes the oxidation of ammonia to oxides of nitrogen, namely, platinum. If the gases are allowed to remain in the catalyst zone for a longer time than is necessary for conversion, further reaction takes place with consequent loss in yield. Furthermore, at the lower velocities which have heretofore been customary under higher presures there has been opportunity for both backward diffusion and for convection currents. As a result of these conditions, the products of the original oxidation of the ammonia may again come in contact with both the catalyst and with unconverted ammonia with resulting undesirable side reactions and further possible loss in yield.

Attempts have been made to overcome these difficulties in the present types of platinum catalysts by operating at higher rates or at higher gas velocities, but this results in some the ammonia going through without coming into contact with the catalyst. This, of course, results in incomplete conversion and in loss of yield.

We have found that by substantially increasing the thickness of the catalyst bed, the gas stream is more thoroughly broken up and efficient contact is obtained even at a substantial increase in the rate of gas flow. In order to properly accomplish this, we have found that it is essential in the case of platinum gauze that the number of layers be greatly increased. At the same time we have found that the velocity of the gas through the catalytic material should be increased to such an extent that the time of contact of the gases with the catalyst is maintained the same. This has been found to cause substantially all the ammonia to be oxidized to oxides of nitrogen without causing appreciable decomposition of nitrogen oxides to nitrogen. We have found furthermore that the linear velocity of the gas through the catalyst should also be maintained high enough to minimize the chance for backward diffusion and convection currents, with consequent decomposition of the oxides of nitrogen on the catalyst. Carrying out this process under pressure according to our invention results among other things in the conversion of substantially increased amounts of ammonia per ounce of catalyst material. For example, when the process is operated under 100 pounds pressure, 7 to 12 times as much ammonia can be efficiently converted to oxides of nitrogen per ounce of catalyst per day as has previously been found possible.

Further advantages resulting from our invention reside in the fact that with this form of catalyst comprising many layers of fine platinum gauze, it is not necessary to fabricate a complicated cylindrical catalyst as has been the practice. The layers of platinum gauze may be supported by a frame such, for example, as a non-catalytic screen. We have found that it is of considerable advantage when a substantial amount of the metal gauze has volatilized to add additional layers without removing those partially used up. In this way we have found that it is not necessary to scrap and rework the old gauze as has heretofore been considered necessary according to the prior art practice, at least until it is substantially used up.

The following is given as a specific embodiment of our invention, but it is to be understood that this is illustrative and that other embodiments exist and may be practiced within the scope of our invention:

While the diameter of wire used in weaving the gauze in the preferred form of our invention may vary as well as the mesh per square inch of the woven gauze, we preferably use gauzes woven from wire approximately .003 inch in diameter, and having approximately 80 meshes per linear inch. The metal may be composed of either platinum, or may consist essentially of platinum, or a platinum alloy. We preferably use 16 layers of the gauze as close together as possible, but not necessarily welded together. Furthermore, while the shape of the gauze may be considered immaterial, we preferably use the flat gauze. According to our invention, with the preferred embodiment of the process as disclosed herein, operated at atmospheric pressure as much as 150 pounds of ammonia per day per ounce of catalyst can be converted efficiently to oxides of nitrogen. Under these conditions the gas is in the catalyst zone approximately .00011 second, while the linear velocity of the gas through the catalyst is of the order of 72 feet per second.

We have also found that when such a catalyst is operated at 100 pounds pressure, from 700 to 1200 pounds of ammonia can be efficiently converted per day per ounce of catalyst. Under these conditions, the gas is in the catalyst zone for about the same length of time as when operated at the lower rate under atmospheric pressure, namely, at 800# of ammonia per ounce of catalyst per day, approximately .00015 sec. and the linear velocity through the catalyst is also about the same, namely, approximately 49 feet per second. The conversion efficiency is also very nearly as good. We have found that efficiencies better than 95 percent may easily be obtained in this manner.

While any number of layers of gauze catalyst from 5 to 50 will give very good conversion efficiencies and satisfactory operation, we have found that approximately 16 layers of the gauze described in the foregoing give the most satisfactory results.

It will be apparent from our disclosure that the catalyst may be in some other form than gauze, for example, a mat, a granular or other finely divided catalyst supported on a permeable membrane or screen can be used in such forms to give good results under satisfactory operation of the process. Furthermore, perforated plates of the kind disclosed in the copending application of one of us, Serial No. 411,414, filed December 4, 1929, may be used in such form as to give the above described results. It will also be understood that it is within the scope of our invention to use alternate layers of gauze made of varying diameter of wire and that alternate layers of the perforated plates described above and gauze may also be used. A certain number of the sheets of gauze, or the perforated plate, or both may be supplemented by an amount of matted or granular material to give the desired results.

It will be apparent from the foregoing that the form which the catalyst takes whether gauze, perforated plates, matted or granular material is not essential to the invention. The invention resides in the increased gas velocity in connection with the desired time of contact, and also in the thorough breaking up of the gas stream and bringing it into intimate contact with the surfaces of the catalyst. This breaking up of the gas stream and extent of catalyst surface should be equal or equivalent to that obtained by the use of many layers of gauze specified.

In the foregoing description, it has seemed essential in properly describing our invention to adopt certain conventional terms in calculating the figures. For example, by the thickness of the layer of gauze we mean the equal of the sum of the diameters of the two wires of which the gauze is made. Also by thickness of the catalyst zone, we mean the distance from face to face of the gauze. Where the layers of gauze are appreciably separated, or where non-catalytic layers are interposed between layers of gauze, we do not intend that such spaces shall be considered as comprising part of the catalyst zone.

In calculating the velocities of the gas flow through the gauze, and the time of contact within the catalyst zone, the catalyst has been considered as having a free gas volume which is the actual volume occupied by the gauze or layers of perforated plates less the volume actually occupied by the metal comprising such gauzes or plates. This method of calculating differs from some of the conventional methods adopted in the literature on this subject where the free air space of the gauze has been considered as its total area less the area formed by a projection of the wires when projected onto a plane surface. It will be apparent that this method of calculating is not as accurate as ours for calculating the time of contact and linear velocity.

In our calculations, no volume change due to the reaction has been taken into account for the reason that this is comparatively small. The temperature of the gas has been assumed as the average temperature of the catalyst, no consideration being given to a possible temperature gradient through the catalyst.

By the term "layers of gauze" as used herein, we mean to include the equivalent of one layer of standard square woven gauze of approximately 80 to 150 mesh of .003 or .0015 wire, or one sheet of thin perforated metal. It will be apparent, of course, from the disclosure herein that several of these layers may be lightly welded together to form a single unit or layer, but for the purpose of our invention this must be considered as consisting of the several layers of which it is made. Furthermore, gauzes may apparently be so woven, tied together or otherwise united that in thickness, in amount of catalytic material, volume and distribution of the gas stream, they are the equivalent of several layers of a single gauze. These modified constructions must be considered the equivalent of several layers and for the purpose of this process, these must be considered as consisting of the several layers to which they are actually equivalent.

As many apparently widely different embodiments of this invention may be made without departing from the spirit thereof,

We claim:

1. In the process of oxidizing ammonia to oxides of nitrogen, the step which comprises bringing a mixture of gaseous ammonia and an oxygen containing gas into contact with a catalyst containing a metal of the platinum group having per unit of cross-sectional area of the gas stream an exposed surface greater than that of four thicknesses of 80 mesh .003" diameter wire gauze.

2. The process of claim 1 in which the exposed surface is equal to from 5 to 50 thicknesses of the gauze.

3. In the process of oxidizing ammonia to oxides of nitrogen, the step which comprises bringing a mixture of gaseous ammonia and an oxygen containing gas at a pressure greater than atmospheric into contact with a catalyst consisting essentially of platinum metals having per unit of cross-sectional area of the gas stream an exposed surface greater than that of four thicknesses of 80 mesh .003" diameter wire gauze.

4. The process of claim 3 in which the exposed surface is equal to from 5 to 50 thicknesses of the gauze.

5. In the process of oxidizing ammonia to oxides of nitrogen, the step which comprises bringing a mixture of gaseous ammonia and an oxygen containing gas into contact with a catalyst comprising a metal of the platinum group having per unit of cross-sectional area of the gas stream an exposed surface equal to from 5 to 50 thicknesses of 80 mesh .003" diameter wire gauze, and mixing and subdividing the gas stream by means of baffled flow during such contact.

6. In the process of oxidizing ammonia to oxides of nitrogen, the step which comprises bringing a mixture of gaseous ammonia and an oxygen containing gas at a pressure greater than atmospheric into contact with a catalyst consisting essentially of platinum metals having per unit of cross-sectional area of the gas stream an exposed surface equal to from 5 to 50 thicknesses of 80 mesh .003" diameter wire gauze and mixing and subdividing the gas stream by means of baffled flow during such contact.

7. The process of claim 1 in which the gas flow is maintained at a linear velocity through the catalyst of from 5 to 100 feet per second.

8. The process of claim 3 in which the gas flow is maintained at a linear velocity through the catalyst of from 5 to 100 feet per second.

9. The process of claim 5 in which the gas flow is maintained at a linear velocity through the catalyst of from 5 to 100 feet per second.

10. The process of claim 6 in which the gas flow is maintained at a linear velocity through the catalyst of from 5 to 100 feet per second.

11. The process of claim 1 in which the gas flow is maintained at a linear velocity through the catalyst of from 20 to 80 feet per second.

12. The process of claim 3 in which the gas flow is maintained at a linear velocity through the catalyst of from 20 to 80 feet per second.

13. The process of claim 5 in which the gas flow is maintained at a linear velocity through the catalyst of from 20 to 80 feet per second.

14. The process of claim 6 in which the gas flow is maintained at a linear velocity through the catalyst of from 20 to 80 feet per second.

15. In the process of oxidizing ammonia to oxides of nitrogen the step which comprises passing a mixture of ammonia and an oxygen containing gas through a catalyst comprising a metal of the platinum group in the form of more than 4 layers of gauze of 60 to 160 mesh per linear inch made of wire .005 to .001 inch in diameter.

16. The process of claim 15 in which the catalyst is in the form of from 6 to 50 layers of fine gauze.

17. The process of claim 15 in which the linear gas velocity through the catalyst is maintained at from 5 to 100 feet per second.

18. The process of claim 15 in which the linear velocity of the gas through the catalyst is maintained at from 20 to 80 feet per second.

19. In the process of oxidizing ammonia to oxides of nitrogen the step which comprises passing a mixture of ammonia and an oxygen containing gas through a catalyst comprising 6 to 50 layers of fine gauze and maintaining the linear velocity of the gas at from 5 to 100 feet per second.

20. The process of claim 19 in which the linear gas velocity through the catalyst is maintained at from 20 to 80 feet per second.

STANLEY L. HANDFORTH.
WILLIAM E. KIRST.